US009423317B2

(12) United States Patent
Frost

(10) Patent No.: US 9,423,317 B2
(45) Date of Patent: Aug. 23, 2016

(54) COMBUSTION CHAMBER MEASUREMENT SYSTEM

(71) Applicant: Inventus Holdings, LLC, Juno Beach, FL (US)

(72) Inventor: Jonathan A. Frost, Stuart, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 216 days.

(21) Appl. No.: 14/145,075

(22) Filed: Dec. 31, 2013

(65) Prior Publication Data

US 2015/0184854 A1 Jul. 2, 2015

(51) Int. Cl.
*G01M 15/14* (2006.01)
*F23N 5/02* (2006.01)
*F23N 5/16* (2006.01)
*F23N 5/24* (2006.01)
*F23R 3/46* (2006.01)

(52) U.S. Cl.
CPC ............... *G01M 15/14* (2013.01); *F23N 5/022* (2013.01); *F23N 5/16* (2013.01); *F23N 5/242* (2013.01); *F23R 3/46* (2013.01); *F05D 2270/301* (2013.01); *F05D 2270/303* (2013.01); *F05D 2270/80* (2013.01); *F23N 2025/04* (2013.01); *F23N 2041/20* (2013.01); *F23N 2900/05005* (2013.01); *F23R 2900/00013* (2013.01)

(58) Field of Classification Search
CPC .................. F23N 2041/20; F23N 2900/05005; F23N 5/16; F23N 5/242; F23N 2025/04; F23M 11/045; G01M 15/14
USPC ....................................................... 73/112.01
See application file for complete search history.

(56) References Cited

U.S. PATENT DOCUMENTS

| 5,419,636 | A | * | 5/1995 | Weiss | ........................ | G01K 5/52 |
| | | | | | | 250/227.14 |
| 5,828,797 | A | | 10/1998 | Minott et al. | | |
| 6,564,556 | B2 | | 5/2003 | Ginter | | |
| 6,742,394 | B1 | * | 6/2004 | Stuttaford | ............... | F01D 17/08 |
| | | | | | | 60/39.01 |
| 7,334,413 | B2 | * | 2/2008 | Myhre | ................... | F01D 17/02 |
| | | | | | | 431/13 |
| 7,484,369 | B2 | * | 2/2009 | Myhre | ................... | F01D 17/02 |
| | | | | | | 60/740 |
| 7,775,052 | B2 | * | 8/2010 | Cornwell | ................ | F01D 17/02 |
| | | | | | | 60/740 |
| 8,099,941 | B2 | * | 1/2012 | Myers | ....................... | F23N 5/00 |
| | | | | | | 60/39.23 |
| 8,200,410 | B2 | * | 6/2012 | Williams | ................ | F23N 1/002 |
| | | | | | | 422/220 |

(Continued)

OTHER PUBLICATIONS

Behbahani, Alireza, Need for Robust Sensors for Inherently Fail-Safe Gas Turbine Engine Controls, Monitoring, and Prognostics (Postprint), Controls/Engine Health Management Turbine Engine Divisio/PRTS, U.S. Airforce Research Laboratory, WPAFB, OH, Nov. 2006.

(Continued)

*Primary Examiner* — Freddie Kirkland, III
(74) *Attorney, Agent, or Firm* — Cozen O'Connor

(57) ABSTRACT

A system and method disclosed may include a dynamic pressure sensor or probe having a wave guide and wave guide tube and a temperature sensor disposed therethrough in order to optimally install and position the temperature sensor to measure combustor flame characteristics. The dynamic pressure sensor is preferably positioned or mounted on the outer casing of the combustor. By taking advantage of the placement of an existing dynamic pressure sensor, a temperature sensor—for instance a fine wire temperature probe—can be disposed through the interior of the dynamic pressure sensor so that combustion flame characteristics can be measured near the combustion liner.

18 Claims, 3 Drawing Sheets

(56) References Cited

U.S. PATENT DOCUMENTS

| | | | | |
|---|---|---|---|---|
| 8,326,513 B2* | 12/2012 | Singh | ............... | F23N 5/242 60/773 |
| 8,616,002 B2* | 12/2013 | Kraemer | ............... | F23N 5/082 60/39.463 |
| 8,616,064 B2* | 12/2013 | Hurst | ............... | G01L 19/0609 73/702 |
| 8,646,278 B2* | 2/2014 | Kim | ............... | F23N 5/16 374/117 |
| 8,733,078 B2* | 5/2014 | Alholm | ............... | F02C 7/266 60/39.821 |
| 8,752,362 B2* | 6/2014 | Kraemer | ............... | F23N 5/082 250/372 |
| 8,894,408 B2* | 11/2014 | Bulat | ............... | F02C 9/28 431/13 |
| 2011/0016871 A1* | 1/2011 | Kraemer | ............... | F23N 5/082 60/772 |
| 2011/0093182 A1 | 4/2011 | Weber et al. | | |
| 2011/0239621 A1* | 10/2011 | Meneely | ............... | F23N 5/16 60/39.281 |
| 2012/0196234 A1 | 8/2012 | Bulat et al. | | |

OTHER PUBLICATIONS

"Combustion Dynamics Instrumentation for the Most Demanding Gas Turbine Measurement & Monitoring Requirements," IMI Sensors, PCB Group, Inc., 2010.

Stiharu, I. and Rybarik, P., "Chapter 6—Sensor Requirement Systems and Roadmaps," R&T Organization, Nato-Otan, RTO-TR-AVT-128, pp. 1-46, Apr. 2009.

* cited by examiner

COMBUSTION CHAMBER MEASUREMENT SYSTEM

FIELD OF THE DISCLOSURE

The present disclosure generally relates to environmental sensors for internal combustion engines, and, more particularly, methods for installing temperature sensors in order to measure the characteristics of a combustor flame for a gas turbine.

BACKGROUND

Combustors on both new and upgraded industrial gas turbines have recently and increasingly utilized Dry Low NOx combustion systems ("DLN combustors" or "DLN combustion systems"). DLN combustors employ lean, premixed combustion for achieving low nitrogen oxide ("NOx") and carbon monoxide ("CO") emissions. DLN combustors have also been utilized in order to comply with more strict regulations for pollutant emissions. The cooler flame temperatures of the lean premixed flames of DLN combustors are the primary mechanism for producing lower NOx levels. As a result, DLN combustors have largely replaced standard diffusion combustors that employ water or steam injection for achieving reduction in NOx emissions.

Many features in DLN combustors make them more complex systems to operate and control than standard diffusion combustors. The increased complexity of DLN combustors may therefore impact the operability, flexibility, and reliability of a gas turbine with which the DLN combustor is installed. Thus, operating and maintenance practices, which would be acceptable or have no negative impact with standard diffusion combustors, are not acceptable when DLN combustors are installed.

For example, modern gas turbines equipped with DLN combustion systems suffer the problem of thermo-acoustic combustion instability. The acoustic characteristics of the combustion chamber, as well as the response of the combustion flame to the fluctuations of pressure, all play a fundamental role on the conditions which may occur when DLN combustion systems are affected by combustion instabilities. Indeed, thermo-acoustic interaction between acoustic pressure oscillations and flame heat release fluctuations are often regarded as the main origin of combustion instabilities in gas turbines. These instabilities must be avoided since they may generate structural vibrations that, in some cases, may lead to failure of the system.

Issues in detecting and controlling combustion instability have existed ever since flames have been confined within ducts. These instabilities occur in many types of combustion system from domestic heating systems to rocket motors and gas turbines. In order to detect and prevent these instabilities from occurring, dynamic pressure sensors are often utilized in gas turbine DLN combustion chambers to detect initial combustion instability. If these instabilities are detected at an early stage, the turbine can be adjusted with little effort for smooth and steady combustion.

These dynamic pressure sensors measure and acquire pressure-related environmental data which may be used to confirm proper operational health of the combustion system, and which can also be used to tune the gas turbine engine so that it is operating with an appropriate balance between combustion dynamics and emissions.

In addition to measuring dynamic pressure, the determination of flame temperature has historically been attributed great importance in the field of combustion technology. Flame temperature is directly correlated with the chemical reaction kinetics and the formation of pollutants such as, for example, NOx. Moreover, knowledge of the release of energy during the combustion process is indispensable for the design of combustion chambers and determination of the mechanical and the thermal loads of all components utilized in the combustion system. U.S. Patent Pub. No. 2012/0196234 to Bulat et al., the entire contents of which are herein incorporated by reference, discloses several possible positions for a temperature sensor to be used with a combustion chamber. U.S. Pat. No. 5,828,797 to Minott et al., the entire contents of which are herein incorporated by reference, discloses the continuous optical monitoring of the combustion process within an igniter port or a pilot flame port. Other references which generally disclose the desirability to obtain temperature data as part of the combustion process include U.S. Pat. No. 6,546,556 to Ginter and U.S. Patent Pub. No. 2011/0093182 to Weber et al., the entire contents of each are herein incorporated by reference.

BRIEF SUMMARY OF THE DISCLOSURE

The following disclosure presents a summary of the invention in order to provide a basic understanding of some aspects of the invention. This summary is not an extensive overview of the invention. It is intended to neither identify critical or necessary elements of the invention nor delineate the scope of the invention. Its sole purpose is to present some concepts of the invention in a simplified form as a prelude to the more detailed description that is presented later.

An embodiment of a system for measuring the characteristics of a combustor flame is provided herein in accordance with the disclosure, the system including a combustion can that is operatively connected to a gas turbine, said combustion can having an outer casing; a dynamic pressure sensor mounted to and operatively connected to said outer casing of said combustion can, wherein said dynamic pressure sensor further comprises a wave guide and wave guide tube; and a temperature sensor disposed through said wave guide and wave guide tube. The combustion can and the gas turbine may further include a dry, low NOx combustion system. The pressure sensor may further include a piezoelectric dynamic pressure sensor. The pressure sensor may further include an end piece. The end may include a channel disposed therein. The temperature sensor may further include a fine wire temperature sensor. The temperature sensor may by disposed through the channel of the end piece.

In another embodiment of the disclosure, a method is provided for measuring the characteristics of a combustor flame, the method including the steps of operatively connecting a gas turbine to a combustion can having an outer casing; mounting and operatively connecting a dynamic pressure sensor to said outer casing of said combustion can, wherein said dynamic pressure sensor further includes a wave guide and wave guide tube; and disposing a temperature sensor through said wave guide and said waive wave guide tube. The method may further include the step of disposing the temperature sensor through a channel disposed in an end piece of the dynamic pressures sensor.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE FIGURES

The disclosure will be further understood, by way of example, with reference to the accompanying drawings, which may not be drawn to scale, in which.

DETAILED DESCRIPTION

The following detailed description and the appended drawings describe and illustrate some embodiments of the invention for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention, such as details of fabrication and assembly. In the accompanying drawings, like numerals represent like components.

Figure 1:
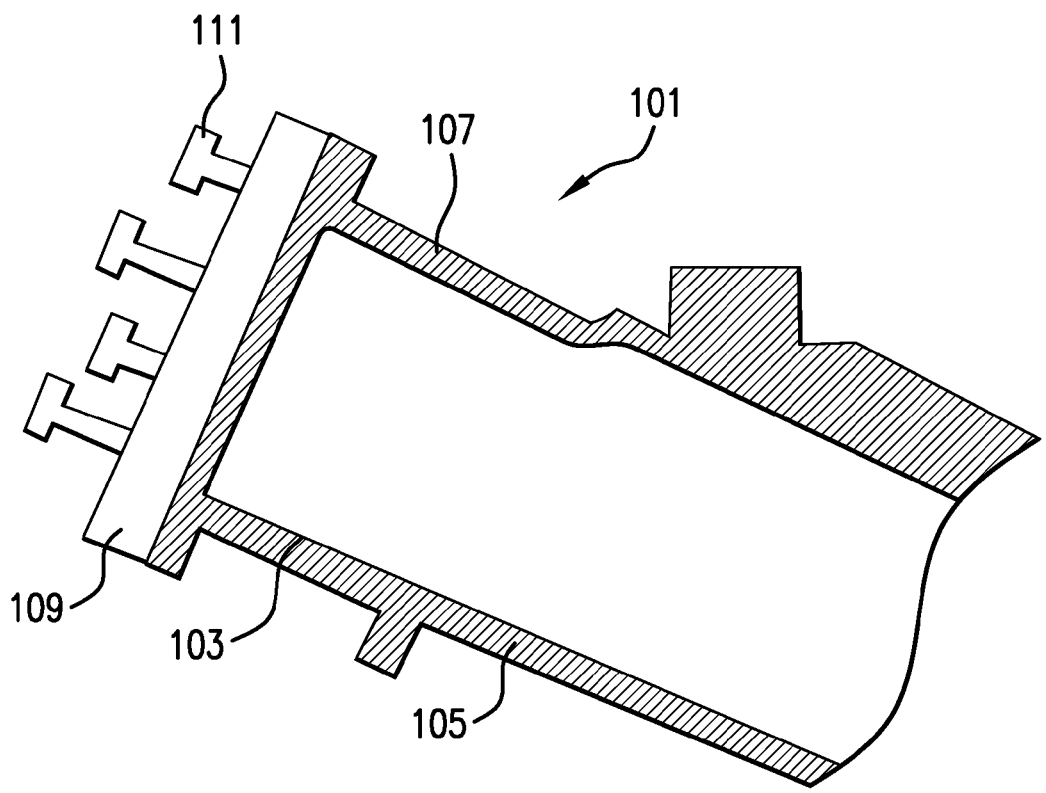
FIG. 1 depicts a cross-sectional view of a combustion chamber and gas turbine.

With reference to FIG. 1, a combustion chamber 101 generally comprises a combustion liner 103 encased by a flow sleeve 105. The flow sleeve 105 may also be encased by an outer casing 107. Combustion chamber 101 may be generally characterized as elongate, or substantially elongate, having an upstream end proximate to an ignition point as well as a downstream end distal to the ignition point. The upstream end of the outer casing 107 may further include a combustion cover 109 having a plurality of nozzles 111 for injecting fuel, air, water, and/or another fluid into the combustion chamber as part of the combustion process. Embodiments of combustion chamber 101, as described herein, may also be referred to as a combustion can 101.

Figure 2:
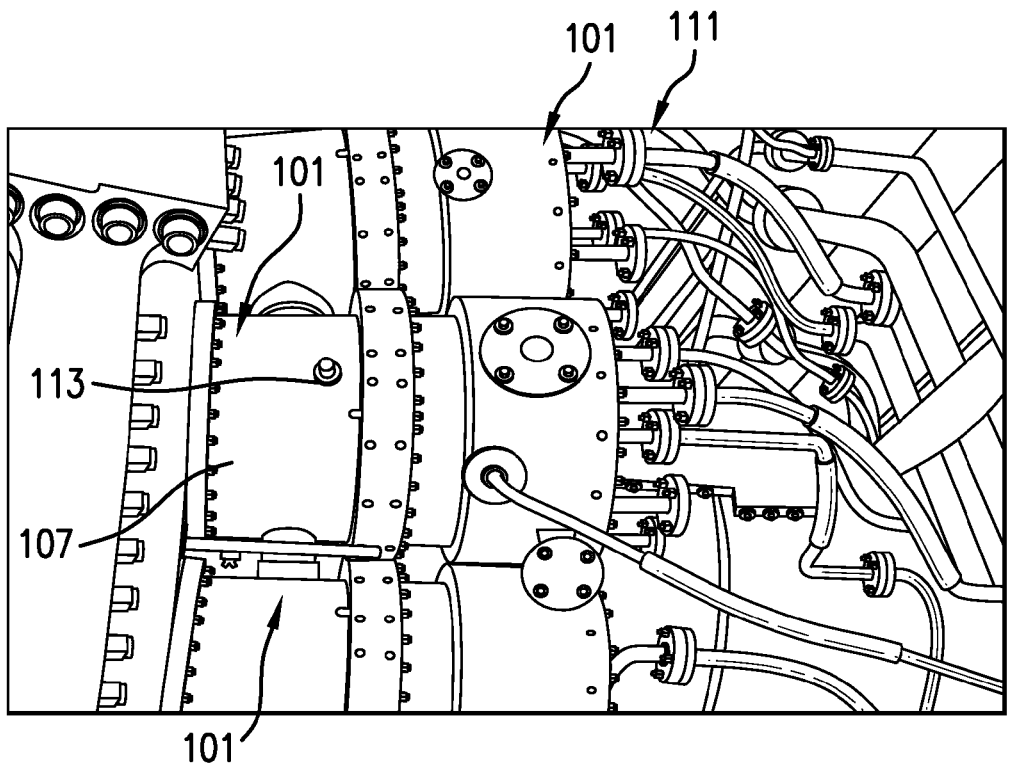
FIG. 2 depicts a perspective view of the combustion can.

With reference now to FIG. 2, industrial gas turbines may comprise a plurality of combustion cans 101 arranged, for instance and as shown in the illustrated embodiment, in a circular array. Each combustion can 101 may be connected to a common downstream location on the engine, which for instance may be a housing for a plurality of pistons or other engine components. A measurement system 200 for detecting or observing the environmental status of one of the combustion cans 101 may include one or more dynamic pressure sensors 201. A variety of position or placements for dynamic pressure sensor 201 are contemplated within the disclosure. The disclosure further contemplates that measurement system 200 may include more than one dynamic pressure sensor 201, for instance at any one of the variety of possible positions disclosed herein. In one embodiment, pressure sensor 201 may be mounted on the outer casing 107 of the combustion can, downstream of the combustion cover 109. In another embodiment, the dynamic pressure sensor 201 may be mounted on or otherwise operatively connected to the injector body. As illustrated in FIG. 2, an embodiment of system 200 includes the dynamic pressure sensor 201 mounted on and operatively connected to the outer casing 107 of the combustion can 101 by and through a sensor port 113 extending into the liner 103. Sensor port 113 may be pre-manufactured in commercial embodiments of combustion chamber 101. Regardless of its location, the dynamic pressure sensor 201 may be adapted to detect changes in pressure within or proximate to combustion chamber 101, for instance by being configured to detect thermo-acoustic pressure oscillations within the combustion chamber.

The dynamic pressure sensor 201 may be in the form of an acoustic microphone that employs a piezoelectric dynamic pressure sensor. The dynamic pressure sensor 201 may also be supported with a protective enclosure that is adapted for high temperature operation within the combustion chamber of a gas turbine engine. An example of a dynamic pressure sensor is disclosed in U.S. Pat. No. 6,928,878 to Eriksen et al., the disclosure of which is incorporated herein by reference in its entirety. An example of a temperature resistant semiconductor support framework for a dynamic pressure sensor is disclosed in U.S. Pat. No. 6,773,951 to Eriksen et al., the disclosure of which is also incorporated herein by reference in its entirety. It is envisioned and well within the subject disclosure that alternative known or to be developed high temperature dynamic pressure sensors may be employed including, for example, PCB sensors (manufactured by PCB Piezoelectronics, Depew, N.Y., USA) and vibrometers.

Figure 3:
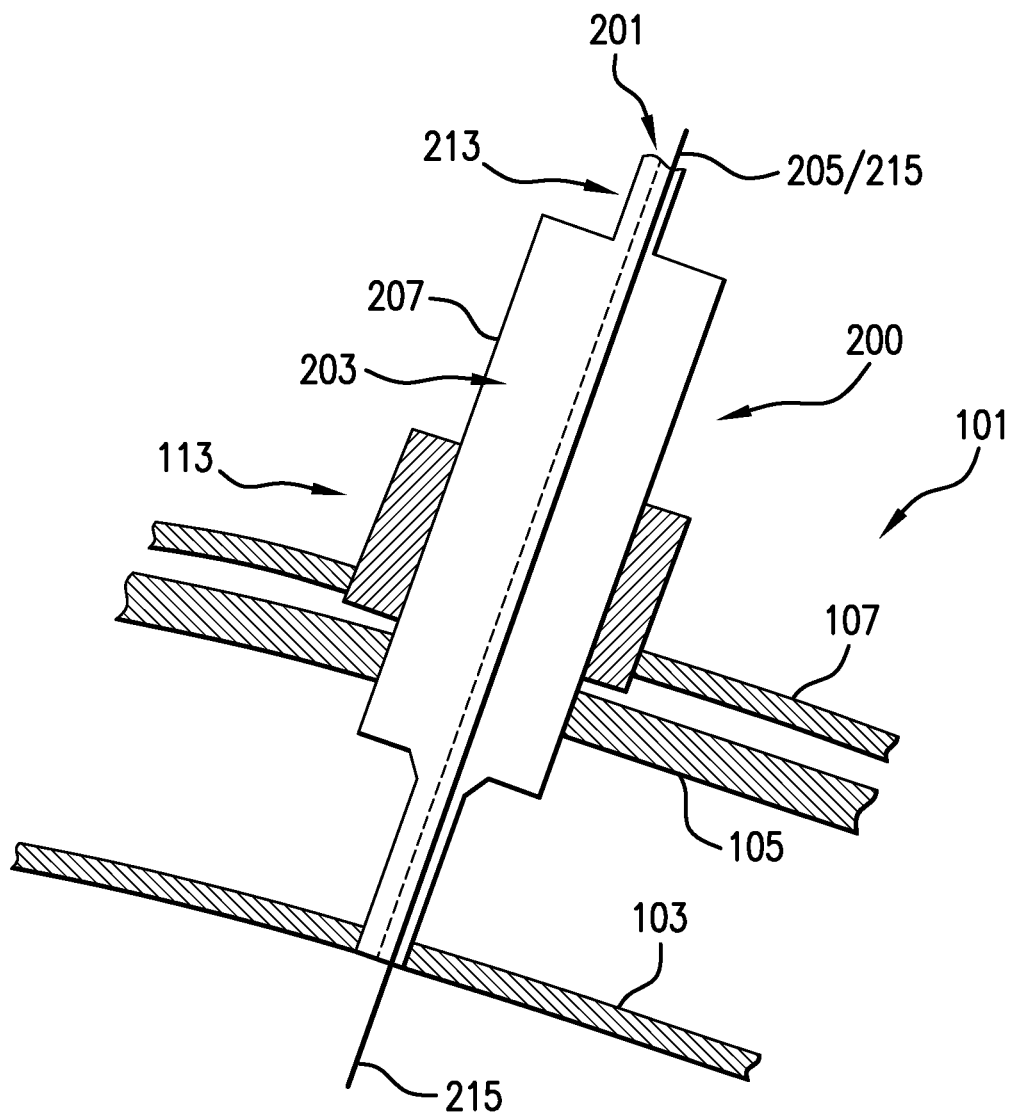
FIG. 3 depicts cross-sectional view of an embodiment of a sensor system.

With reference to FIG. 3, the dynamic pressure sensor 201 disclosed herein generally comprises a housing and inner sensing portion 203. The pressure sensor 201 may further include a wave guide 205 and wave guide tube 207. Wave guide 205, as shown and described, may pass through at least a portion of housing and wave guide tube 207. In one embodiment, wave guide tube 207 and housing are the same component, although in other embodiments a separate wave guide 207 may be disposed within inner sensing portion 203. The wave guide 205 and wave guide tube 207 may be operatively connected to outer casing 107 and terminate at, or penetrate through, the combustion liner 103 so as to collect environmental data from the combustion chamber 101 at or beyond liner 103. Accordingly, pressure sensor 201 may extend passed flow sleeve 105 and outer casing 107. A temperature sensor 215 may be provided within at least a portion of dynamic pressure sensor 201. As such, a sensor system may include a pressure sensor 201 and a temperature sensor 215. Wave guide 205 may be provided in order to guide temperature sensor 215 into at least a portion of the housing and into inner sensing portion 203. As described herein, temperature sensor 215 may also be inserted through wave guide 205. A single wave guide 205 and wave guide tube 207 may be utilized for both pressure sensor 201 and temperature sensor 215 or, alternatively, a first wave guide may be used in association with pressure sensor 201 while a second wave guide may be used in association with temperature sensor 215.

Figure 4:
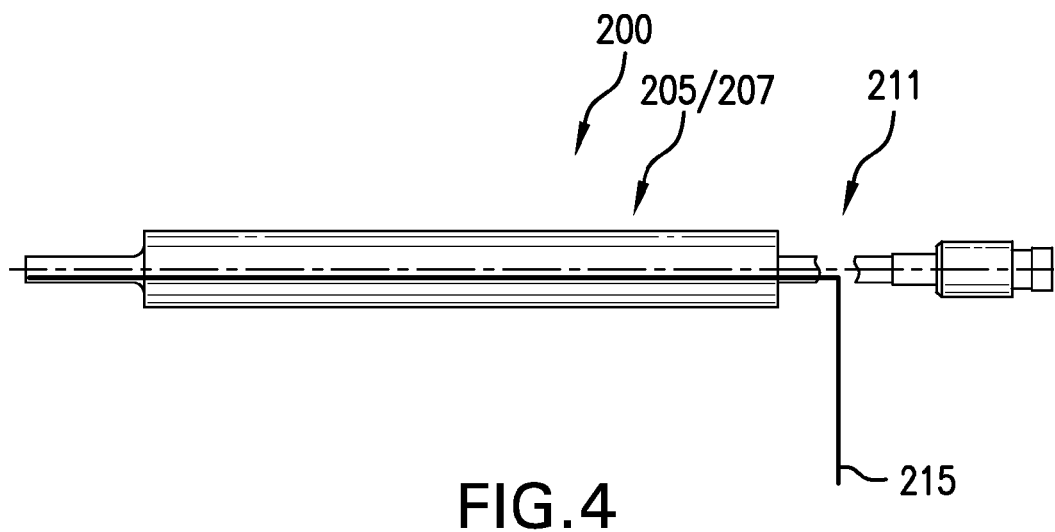
FIG. 4 depicts a close-up view of an embodiment of a dynamic pressure sensor having a fine wire temperature sensor drawn therethrough.

With reference to FIG. 4, sensing system 200 may further include a temperature sensor 215, which, for instance, may be disposed within the wave guide 205 and wave guide tube 207 of the dynamic pressure sensor 201, the wave guide 205 and wave guide tube 207 having a sufficient diameter to permit the temperature sensor 215 to be inserted therethrough within the wave guide tube 205. The temperature sensor 215 may be a fine wire sensor that may be disposed within the wave guide tube and exits the dynamic pressure sensor through a channel in the pressure sensor's end piece 211. In one embodiment, the outer diameter of the wave guide tube 207 may have a diameter of approximately ¾ inch while the channel in the pressure sensor's end piece 211 may be approximately ¼ inch, and wave guide 205 and temperature sensor 215 each have a diameter of approximately ⅛ of an inch. The temperature sensor may detect flame characteristics relating to combustion characteristics such as an equivalence ratio and temperature. In particular, the temperature sensor may be adapted and configured to detect spectral and/or thermal characteristics of the combustor flame that occur downstream from the combustion cover. Temperatures within the combustion chamber 101 may be between 2450 degrees Fahrenheit and 3000 degrees Fahrenheit. As such, embodiments of a temperature sensor 215 must be able to withstand and operate at these high temperatures. Temperature sensor 215 may be constructed of multiple materials. For instance, temperature sensor 215 may be constructed from a first material having lower temperature threshold and a second material having a higher temperature threshold, the second material being the portion of temperature sensor 215 extending towards are past liner 103 into chamber 101. In embodiments where temperature sensor 215 is comprised of two materials, the first and second materials may be joined at a point within inner sensing portion 203. The pressure sensor 201 may further include an end piece 211 and locking nut 213 which may secure the end piece 211 to the housing and inner sensing portion 203.

Figure 5:
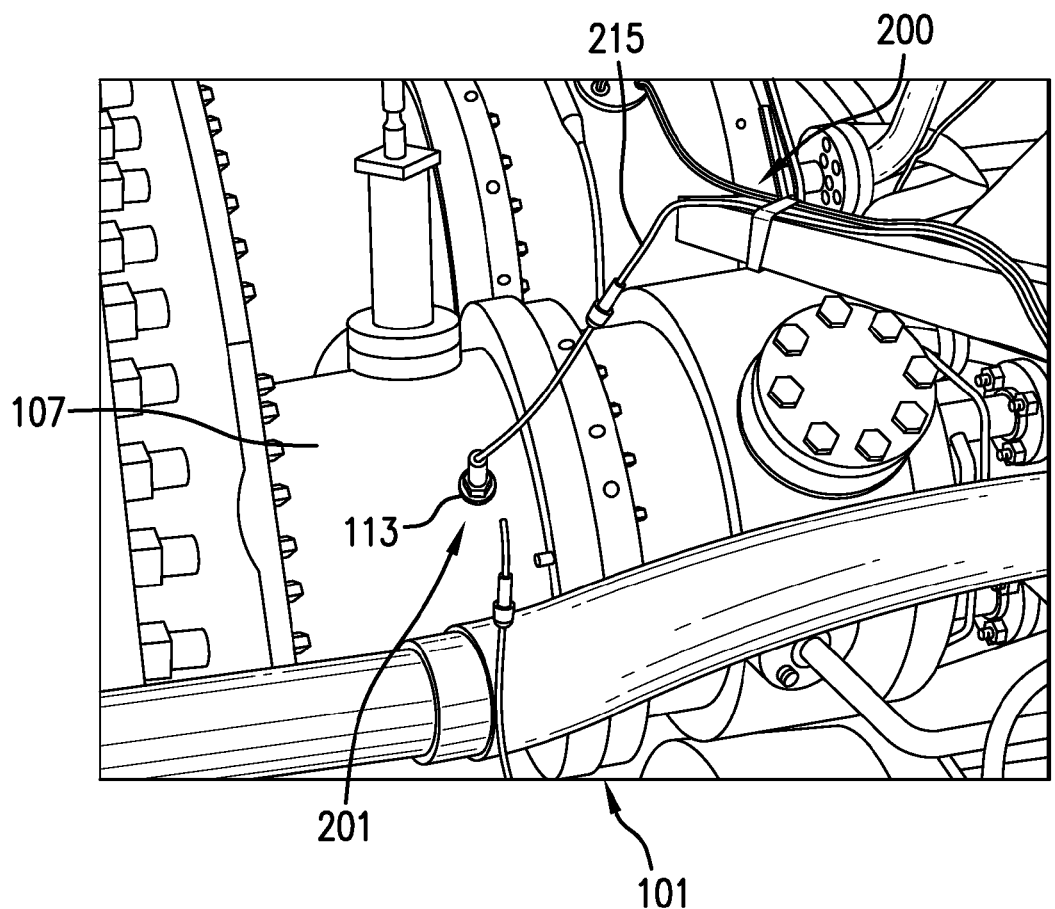
FIG. 5 depicts a perspective view of a combustion can having an embodiment of a dynamic pressure sensor and fine wire temperature sensor mounted thereon.

With reference to FIG. 5, the temperature sensor 215 may be disposed through the dynamic pressure sensor 201 mounted on the outer casing 107 of the combustion can 101. In the illustrated embodiment, the dynamic pressure sensor 201 is mounted on a sensor port 113. The resulting sensor system 200 permits a multi-faceted environmental reading to be taken from combustion chamber 101. Environmental data, including both pressure and temperature readings, taken from combustion chamber 101 may be particularly useful in troubleshooting failures or error sources in a multi-combustor gas turbine. Where, for instance, a single combustor 101 in a combustor array is malfunctioning, direct environmental measurement of each combustor 101 will permit an operator to identify sources of malfunctions not readily apparent by a downstream measurement. It has been estimated that direct environmental measurement of a combustion chamber in a multi-combustor turbine may reduce operating costs by approximately sixty six percent.

The descriptions set forth above are meant to be illustrative and not limiting. Various modifications of the invention, in addition to those described herein, will be apparent to those skilled in the art from the foregoing description. Such modifications are also intended to fall within the scope of the concepts described herein. The disclosures of each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention. It is thus intended that the embodiments disclosed in the specification be considered as illustrative, with a true scope and spirit of the invention being indicated by the following claims.

What is claimed is:

1. A system for measuring the characteristics of a combustor flame comprising:
    a combustion can that is operatively connected to a gas turbine, said combustion can having an outer casing;
    a dynamic pressure sensor mounted to and operatively connected to said outer casing of combustion can, wherein said dynamic pressure sensor further comprises a wave guide and wave guide tube; and
    a temperature sensor disposed through said wave guide tube, said temperature sensor operative to sense a combustion temperature inside said combustion can.

2. The system of claim 1, said combustion can and said gas turbine further comprising a dry, low $NO_x$ combustion system.

3. The system of claim 1, said pressure sensor further comprising a piezoelectric dynamic pressure sensor.

4. The system of claim 1, said pressure sensor further comprising an end piece.

5. The system of claim 4, said end piece further comprising a channel disposed therein.

6. The system of claim 1, said temperature sensor further comprising a fine wire temperature sensor.

7. The system of claim 5, said temperature sensor further disposed through said channel of said end piece.

8. The system of claim 1, said temperature sensor further disposed through said wave guide.

9. A method for measuring the characteristics of a combustor flame, the method comprising the steps of:
    operatively connecting a gas turbine to a combustion can having an outer casing;
    mounting and operatively connecting a dynamic pressure sensor to said outer casing of said combustion can, wherein said dynamic pressure sensor further comprises a wave guide and wave guide tube; and
    disposing a temperature sensor through said wave guide tube, wherein said temperature sensor is operative to sense a combustion temperature inside said combustion can.

10. The method of claim 9 further comprising the step of disposing said temperature sensor through a channel disposed in an end piece of said dynamic pressure sensor.

11. The method of claim 10 wherein said dynamic pressure sensor is operative to sense a dynamic pressure inside the combusion can.

12. The method of claim 11 further comprising mounting and operatively connecting the dynamic pressure sensor and the temperature sensor through the outer casing such that a pressure and a temperature are measured downstream of a combustion cover of said combustion can.

13. The method of claim 9 wherein said combustion can and said gas turbine comprise a dry, low $NO_x$ combustion system.

14. The method of claim 9 wherein said pressure sensor comprises a piezoelectric dynamic pressure sensor.

15. The method of claim 9 wherein said temperature sensor comprises a fine wire temperature sensor.

16. A method for measuring the characteristics of a combustor flame, the method comprising the steps of:
    operatively connecting a gas turbine to a combustion can having an outer casing;
        providing a dynamic pressure sensor operative to sense a dynamic pressure inside the combusion can, the dynamic pressure sensor comprising a wave guide and a wave guide tube;

providing a temperature sensor operative to sense a combustion temperature inside the combustion can, the temperature sensor being disposed through the wave guide tube; and mounting and operatively connecting the dynamic pressure sensor and the temperature sensor through the outer casing such that a pressure and a temperature are measured downstream of a combustion cover of the combustion can.

17. The method of claim 16 wherein said pressure sensor comprises a piezoelectric dynamic pressure sensor.

18. The method of claim 16 wherein said temperature sensor comprises a fine wire temperature sensor.

\* \* \* \* \*